Patented May 20, 1941

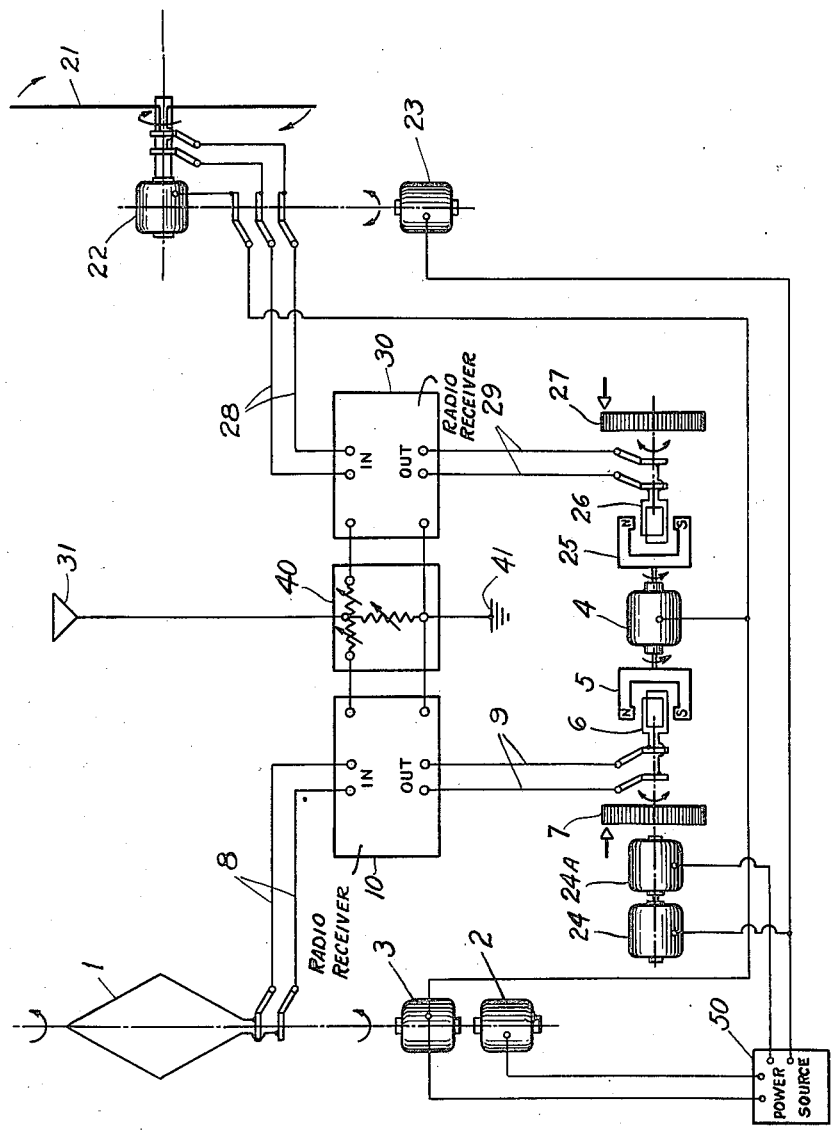

2,242,530

UNITED STATES PATENT OFFICE 2,242,530

RADIO DIRECTION FINDER

Tyng M. Libby, Seattle, Wash.

Application June 9, 1937, Serial No. 147,334

11 Claims. (Cl. 250—11)

Radiation from an antenna is considered to establish a field which extends from the antenna in the form of waves having convex fronts normal to the direction of propagation at any point on the wave front.

It is an object of this invention to determine at some point distant from the antenna, the point of reception, the direction of propagation at that point, by, first, determining at that point a plane normal to the wave front, that is a plane intersecting the wave front on a great circle, and, second, by determining in this normal plane the line which is tangent to the wave front at the point of reception. A line lying in the normal plane, normal to the tangent line, and intersecting the tangent line at the point of reception, will be normal to the wave front at this point and the direction of propagation at this point will lie along this normal line, called the direction of propagation as received. It is apparent that this normal line, or direction of propagation, may be determined first instead of the tangent line as a determination of one is a determination of the other, as all determinations are made at the point of reception. This normal line may also be considered to be the intersection of two planes normal to the wave front and both containing the point of reception. These planes may be determined in several ways.

This radiation, or field, is considered to have an electric component and a magnetic component, which components are at right angles to each other and to the direction of propagation. If a conductor is placed in this field so that its length has a projection upon the electric component, a difference of potential will be developed along the conductor. This potential will be a maximum when the conductor is parallel to the electric component, and will be a minimum when the conductor is in a plane passing through the magnetic component and the direction of propagation.

If two such conductors, each having a potential developed along its length, be placed in the field and be spaced apart in the direction of propagation of the wave, there will be at any instant a difference of potential between the two conductors. If the actual distance between these conductors is maintained fixed and the conductors are rotated about an axis having a projected length on the electric component, the potential will vary and will have four critical values, two maxima and two minima, for each rotation of the conductors about the axis. The plane passing through this axis and the maxima, that is the plane of the conductors when induction is a maximum, is a plane normal to the wave front at this point of reception.

The line tangent to the wave front through the point of reception and lying in the normal plane, called the tangent line, may be obtained by rotating a conductor in the normal plane and about an axis through the point of reception. The potential developed along this conductor will then vary in a pattern similar to that had in the determination of the normal plane. A line through the maxima and the axis of this pattern will be the tangent line. A plane containing the axis of rotation of this conductor and at right angles to the position of maximum potential of the conductors will form a second normal plane the intersection of which planes will determine the desired normal line and direction of propagation.

It is apparent that the normal plane and the tangent line may be determined by the use of minimum as well as maximum values, and that a determination of one such critical value is a determination of the other. Also, a determination of a normal plane is also the determination of a tangent plane or a plane parallel thereto, and that the determination of a tangent line is also the determination of a normal line. Thus there are other planes which these conductors may determine but they are all equivalents and naming or determining one is a determination of others.

In practice the two spaced conductors for determining the normal plane are had in the loop antenna, the Adcock antenna, or other similar directional antennae. For convenience of designation the term loop antenna will be used in this specification and in the claims to designate all antennae of this type, those which may be used for determining a normal plane. Also, the phrases "continuously and periodically positioning a loop (or dipole) antenna to and from a known position," "means for rotating said loop (or dipole) antenna," and similar phrases mean, in part, either that the actual structure of the antenna is positioned or rotated, or that such an antenna is operated upon to cause positioning or rotation of its directivity characteristic, the phrases are generic to these two concepts.

In practice the single rotatable conductor is had in the dipole antenna, and this term will be used to designate all antennae of this type, those which may be used for determining the line of maximum reception in a plane.

A further discussion of the physical phenomena involved may be found in the patent to John C. Schelleng, Number 1,931,853, granted Oct. 24, 1933.

It is a further object of this invention to provide means for maintaining the plane of rotation of the dipole antenna in the normal plane regardless of changes in the relative location of the normal plane.

It is a further object of this invention to provide indicators which will continuously show the direction of propagation of a radio wave as received.

It is a further object of this invention to provide in an indicator, a simple means for producing a synchronised rotating field.

It is to be noted in connection with this description that the word direction refers to a line of direction, not a plane, and that a line or a plane has sense only when so stated.

Description

The figure is a schematic showing of a radio direction finder embodying the present invention.

A loop antenna is shown at 1 which may be rotated about an axis by the motor 2 at any desired speed. Driven by the motor 2 and turning in synchronism with the loop 1 is a generator 3 of the type known as a self-synchronous A. C. inductive generator. Electrically connected to this generator 3 is a self-synchronous motor 4. The construction of this motor and generator is such that angular displacement of the armature of one will result in an equal angular displacement of the armature of the other. Rotated in synchronism with the loop 1, by the generator 3 and motor 4, is the permanent magnet 5. Mounted co-axially with the magnet 5 is a rotatable coil 6. Moving with the coil 6 is the scale 7. The parts 4, 5, 6, and 7 comprise an indicator. This scale is laid off in degrees, the plane of which may be considered as normal to the axis of rotation of the loop.

Linking the loop 1 and the coil 6, by electrical connections 8 and 9, is the radio receiver 10.

A dipole antenna is shown at 21. This dipole is rotated about an axis by a self-synchronous motor 22, of the same type as motor 4, and driving in synchronism therewith. The dipole antenna 21 and the motor 22 are rotated about another axis by a self-synchronous motor 23 which is in synchronism with the self-synchronous A. C. inductive generator 24. This generator 24 is connected to and actuated by the torque amplifier 24A, which in turn is controlled by movement of the coil 6, all in a manner which will keep the generator in phase with the coil. Turning in synchronism with the dipole antenna through the motors 4 and 22 is the permanent magnet 25. Mounted co-axially with the magnet 25 is the rotatable coil 26. Moving with the coil 26 is the scale 27. The parts 4, 25, 26, and 27 comprise another indicator. The dipole antenna is connected to the input of receiver 30 by means of conductors 28 while the receiver output is fed to coil 26 by means of conductors 29.

The non-directional antenna 31 is connected to the coupling unit 40 which permits transfer of the energy received to either or both receivers for a purpose to be described. The ground 41 is common to the two receivers 10 and 30, and the coupling unit 40.

Power for the operation of the various motors and devices is had from source 50.

The wiring between the various motors has, for simplicity of illustration, been shown as a single line, whereas, in practice it would vary from two to five or more wires, depending upon the details of the various pieces of equipment.

The details of construction of the radio receivers 10 and 30, and the coupling 40, will be apparent from the statement of their operation as the means for obtaining such operation are well known in the art.

Operation

When a radio receiver such as 10, which has been adjusted for reception from a particular station, is energized from a loop which is rotated about an axis in the plane of the loop, the resultant reception pattern will be of the well known figure eight form. Were this same receiver to be energized from a non-directional antenna such as 31, the resultant reception pattern would be circular. By the use of both the rotating loop 1 and the non-directional antenna 31 which is coupled to receiver 10 by means of coupling unit 40, the resultant reception pattern will be in a cardioid form. In other words, as the loop is rotated through 360 degrees about its axis the energy received from the non-directional antenna will be combined in phase with that received from the loop resulting in a maximum corresponding to one position of the loop while at a loop position 180 degrees different, the received energy from the two sources, will be in a phase opposition resulting in a minimum value.

Receiver 10, when energized from the loop and non-directional antenna in the above-described manner will produce a rectified current in its output varying from a maximum to a minimum value corresponding to the respective values of radio frequency energy applied to its input. Maximum current will result at the instant that the rotating loop passes through a position of maximum induction with the oncoming wave. In this position the loop will lie in a plane normal to the wave front. If this rectified current is fed to the freely rotatable coil 6, within the magnetic field produced by magnet 5 which is rotating in synchronism with loop 1, the coil 6 will assume a position embracing maximum flux. This position of the coil corresponds to the position of the loop when it is in the normal plane. The scale 7 is attached to and moves with coil 6 and when related to its reference mark shows the position and sense of the normal plane about the axis of the loop.

In order to reduce the period of excitation of the coil 6 the output detector of the receiver may be biased below cutoff so that output current flows only when the bias is exceeded. It is also possible to utilize other devices such as a trigger tube, varister, or 313A tube placed in the receiver output circuit, to accomplish the same result. By reducing the time period of excitation the operation will be more stable and the tendency for the moving element to hunt, or oscillate to and fro, will be eliminated. By incorporating in the receivers an automatic sensitivity control operated by changes in amplitude of energy derived from the non-directional antenna, the period of excitation may be maintained at the desired value.

Due to an initial adjustment of the relative position of the plane of the coil 6 and the plane of rotation of the dipole antenna 21, and the subsequent action of the torque amplifier 24A actuating the generator 24 and the motor 23 to maintain this relative position as the coil 6 shifts about its axis, the plane of rotation of the dipole will be in the plane of the coil at the instant of maximum induction in said coil, and hence in the normal plane determined by the loop antenna.

As the dipole 21 is rotated by the motor 22 and the plane of rotation maintained by the motor 23 in the normal plane, and the receiver 30 adjusted for reception from the same station as the other receiver, the resultant reception pattern will be of a figure eight form similar to that obtained from the loop 1. If by means of coupling unit 40 energy from the non-directional antenna 31 is introduced into the receiver 30 in conjunction with that obtained from the rotating dipole antenna, there will result a cardioid reception pattern. This pattern may be considered to lie in the normal plane and its major axis will be the line of tangency in the normal plane, at the wave front. The orientation in the normal plane, of the line of tangency will be shown by the scale 27, which, with its related parts, is operated in a manner similar to the scale 7 and its related parts. The reading of the scale 27 may be either an indication of the tangent line or of the normal thereto which is the angle of altitude of the normal line in the plane indicated by the reading of the scale 7. Said reading of the scale 7 may be considered as the angle of azimuth around the axis of rotation of the loop in a plane normal to the axis of rotation.

If the non-directional antenna were not used, the determination of direction could still be made but it would lack sense. That, is the determination might be 180° from the true direction. This is due to the two lobes of the loop or dipole reception diagram. Also, the non-directional component may be fed into either or both of the receivers in order to determine the sense of the direction. If the non-directional component is not fed into the coil 6 or 26 the related rotating field must have twice the revolutions of the antenna, as the coil will be receiving twice the number of impulses due to the two lobes of the figure eight reception diagram. The rotating field set up by the permanent magnets 5 and 25, and the motor 4, may be obtained in other ways besides that shown, as by a quarter phase generator and motor such as described in the article by H. Busignies, in Electrical Communication, No. 2, vol. 15, p. 57, Oct. 1936, published by International Standard Electric Corporation. The coils 6 and 26 may be driven in synchronism with their related rotating antenna while the magnets 5 and 25 may be pivoted and attached to the respective indicators 7 and 27. The magnet 5 may be mounted directly upon the same shaft as the rotating loop 1.

The torque amplifier 24A is a device controlled by a small torque, and which will, acting throuugh motor 24, have the large output needed to orientate the dipole to rotate in the proper plane. This torque amplifier may be of the type such as shown in the patent to Bruno A. Wittkuhns, Number 1,999,646, Apr. 30, 1935, or the patent to F. L. Moseley, Number 2,077,179, Apr. 13, 1937.

The motor 4 might be replaced by two separate motors. One of these motors would act in synchronism with the loop and one in synchronism with the dipole. The speed of the loop and the dipole need not be synchronised.

The scales 7 and 27 may be fixed with respect to the instrument as a whole, or a vehicle mounting the instrument, while the associated reference marks may be moved by the respective coils 6 and 26. It will be understood that by "actuation" of a scale is meant its movement relative to its reference mark regardess of which is fixed relative to the instrument, or whether both are in motion relative to the instrument, or whether both are in motion relative to the instrument and the indication is a differential of two motions.

Having thus described my invention, I claim:

1. In a radio direction finder: means for continuously determining and indicating a plane normal to a particular wave front at a point of reception, a dipole antenna, means for continuously rotating said dipole antenna about an axis normal to said normal plane, and means for continuously determining and indicating the position of said dipole when reception of said particular wave is a maximum.

2. In a radio direction finder: means for finding and continuously indicating a plane normal to a particular wave front at a point of reception, a dipole antenna, means for continuously rotating said dipole antenna, means actuated by said first means for maintaining the axis of rotation of said dipole normal to said plane, and means for indicating the position of said dipole when the reception by said dipole of said particular wave is a maximum.

3. In a radio direction finder: means for determining and continuously indicating a plane normal to a particular wave front at a point of reception, means for determining and continuously indicating the line in said plane normal to said wave front at said point of reception, and means including said previous means for determining and continuously indicating the sense of the direction of propagation of said wave front.

4. In a radio direction finder: means for determining and continuously indicating a plane normal to a particular wave front at a point of reception, a dipole antenna, means for continuously rotating said dipole antenna, means for maintaining the plane of rotation of said dipole parallel to said normal plane, and means including a radio receiver for determining the position of maximum reception by said dipole antenna.

5. In a radio direction finder: a loop antenna, means for continuously rotating said loop antenna, a radio receiver, means including said radio receiver for indicating a plane which is the plane of said loop when in the position of maximum reception from a particular station, a dipole antenna, means for rotating said dipole in a plane, means for maintaining the plane of rotation of said dipole substantially parallel to said plane which is the plane of said loop when said loop is in the position of maximum reception, and means including a radio receiver for indicating the position of maximum reception by said dipole antenna from said station.

6. In a radio direction finder system: a first directional antenna, means operating upon said antenna for causing continuous rotation of the directivity characteristic of said antenna, a radio receiver, means including said radio receiver for indicating the orientation of said characteristic at the time of maximum reception from a particular station, the axis of rotation of said characteristic and said indication determining a plane normal to the wave front projected from said station, a second directional antenna, means operating upon said second antenna for causing continuous rotation of the directivity characteristic of said second directional antenna in said normal plane, a second radio receiver, and means including said second radio receiver for indicating the orientation of said directivity characteristic of said second directional antenna at the time of maximum reception from said station.

7. In a radio direction finder: a loop antenna; a dipole antenna; a non-directional antenna; a first radio receiver associated with said loop antenna and with said non-directional antenna; a second radio receiver associated with said dipole antenna and with said non-directional antenna; indicators associated with said first and with said second radio receivers; means for rotating said loop antenna and dipole antenna in synchronism with parts of their respective indicators; means including said radio receivers, said antennae, and said indicators for establishing: the position of said parts of said indicators at the time of maximum reception by their respective antennae, and the sense of said reception; and means for maintaining the axis of rotation of said dipole fixed relative to a plane of maximum reception by said loop antenna.

8. In a radio direction finder: a loop antenna; means for establishing a rotatable magnetic field; a rotatable coil situated in said magnetic field; means for rotating said loop and for obtaining relative motion between said field and said coil in synchronism with said loop, comprising: a radio receiver for impressing upon said coil the signal receivable by said loop as said loop passes through a position of maximum induction, whereby the position of the instantaneously resulting field, and the plane of propagation and maximum induction are indicated; a dipole antenna rotatable about an axis fixed relative to said plane of maximum induction; means for establishing a rotatable magnetic field; a rotatable coil situated in said magnetic field; means for rotating said dipole and for obtaining relative motion between said field and said coil in synchronism with said dipole, comprising: a radio receiver for impressing upon said coil the signal receivable by said dipole as said dipole passes through a position of maximum induction, whereby the position of the instantaneously resulting field, the line of maximum induction, and the direction of propagation in said plane are indicated; and a non-directional antenna in combination with said previously described elements for determining the sense of said direction of propagation.

9. A radio direction finder, comprising: a loop antenna; means for continuously rotating said antenna; a non-directional antenna; a radio receiver having its input terminals electrically coupled to said antenna; two co-axial elements rotatable with respect to each other, one of said elements being rotated in synchronism with said loop antenna, one of said elements being freely rotatable, one of said elements producing a magnetic field, and the other element being periodically energized by the output of said radio receiver as said loop antenna passes through a position of maximum induction with respect to a particular wave front, so that the freely rotatable element is orientated to a definite position with respect to the position of said loop antenna as it passes through said position of maximum induction; a dipole antenna; means for continuously rotating said dipole antenna; a radio receiver having its input terminals electrically coupled to said dipole antenna; two co-axial elements rotatable with respect to each other, one of said elements being rotated in synchronism with said dipole antenna, one of said elements being freely rotatable, one of said elements producing a magnetic field, and the other element being periodically energized by the output of said latter radio receiver as said dipole antenna passes through its position of maximum induction with respect to said wave front, so that the freely rotatable element is orientated to a definite position with respect to the position of said dipole antenna as it passes through said position of maximum induction; means for positioning the plane of rotation of said dipole antenna in parallelism with a plane which is the plane of said loop antenna when said loop antenna is in its position of maximum induction with respect to said wave front; and scales actuated by each of said orientated elements to indicate the positions of said loop and said dipole antennae when their respective inductions are a maximum, with respect to said wave front.

10. A radio direction finder, comprising: a loop antenna; means for continuously rotating said loop antenna; a radio receiver having its input terminals electrically coupled to said antenna; two co-axial elements rotatable with respect to each other, one of said elements producing a magnetic field, one of said elements being rotated in synchronism with said loop antenna, the other of said elements being freely rotatable, and one of said elements being energized by the output of said receiver, the mutual force between said elements, by virtue of the said magnetic field and the said receiver output, causing said freely rotatable element to orient to a definite position with respect to the position of said loop antenna when its induction is a maximum, with respect to a particular wave front; a dipole antenna; means for continuously rotating said dipole antenna; a second radio receiver having its input terminals electrically coupled to said dipole antenna; a second pair of co-axial elements rotatable with respect to each other, one of said second pair of elements producing a magnetic field, one of said second pair of elements being rotated in synchronism with said dipole antenna, the other of said second pair of elements being freely rotatable, and one of said second pair of elements being energized by the output of the said second radio receiver, the mutual force between said second pair of elements by virtue of the last mentioned magnetic field and the output of said second receiver, causing the freely rotatable element of said second pair of elements to orient to a definite position with respect to the position of the said particular wave front; means for positioning the plane of rotation of said dipole antenna in parallelism with a plane which is the plane of said loop antenna when the induction in said loop antenna is a maximum with respect to said wave front; scales actuated by said oriented elements to indicate the positions of said loop and dipole antennae when their respective inductions are a maximum with respect to said wave front; and a non-directional antenna connected to the input terminals of both of said radio receivers whereby said indicators will also indicate the sense of said wave front.

11. A device for determining the direction of reception of a radio wave from a particular station, comprising: a loop antenna, means for continuously and periodically positioning said loop antenna to and from a known relationship with a plane normal to the wave front at the point of reception, means for determining the position of said loop antenna when in said relationship to locate said normal plane, a dipole antenna having a support rotatable about an axis normal to the poles of said dipole, means actuated by said second means for maintaining the axis of rotation of said dipole antenna normal to said normal plane, means for continuously and periodically positioning said dipole antenna about said axis to and from a known relationship with a line normal to the wave front at the point of reception, and means for determining the position of said dipole in said relationship to locate said normal line, the direction of said normal line being the direction of reception at the point of reception of the radio wave from said particular station.

TYNG M. LIBBY.